Aug. 31, 1965  G. E. MACY  3,203,559
LUMBER SORTING AND PILING DEVICE
Filed July 30, 1962  7 Sheets-Sheet 1

George E. Macy, INVENTOR.
BY
ATTORNEY.

George E. Macy, INVENTOR.

Aug. 31, 1965

G. E. MACY 3,203,559

LUMBER SORTING AND PILING DEVICE

Filed July 30, 1962

George E. Macy,
INVENTOR.

BY
ATTORNEY.

Figures 6–11

George E. Macy
INVENTOR.

Aug. 31, 1965  G. E. MACY  3,203,559
LUMBER SORTING AND PILING DEVICE
Filed July 30, 1962  7 Sheets-Sheet 5

George E. Macy,
INVENTOR.

BY
ATTORNEY.

Aug. 31, 1965   G. E. MACY   3,203,559
LUMBER SORTING AND PILING DEVICE
Filed July 30, 1962   7 Sheets-Sheet 7

George E. Macy.
INVENTOR.
BY *[signature]*
ATTORNEY.

United States Patent Office

3,203,559
Patented Aug. 31, 1965

3,203,559
LUMBER SORTING AND PILING DEVICE
George E. Macy, 1913 Pennsylvania Ave.,
Coeur d'Alene, Idaho
Filed July 30, 1962, Ser. No. 213,212
2 Claims. (Cl. 214—6)

This invention relates generally to a lumber separating and piling device, and more particularly to such a device that semiautomatically sorts lumber for length, thickness, width, species, quality, or like attributes and, after said sorting classification has been completed, segregates each piece into the appropriate group and piles it with other members of the same group.

In the lumber industry, particularly the soft-wood industry where it is necessary to handle relatively large volumes of the product at a relatively low cost, the last residual operation carried on primarily by hand is that of sorting, grading and piling the sawed product. This hand operation is both slow and relatively costly. By reason of this, various devices have heretofore become known to accomplish both the sorting operation and the piling operation.

Sorters, particularly of the completely automatic variety depending upon some usually physical characteristic of the product for their classification operation, have been known but have not been widely accepted in the industry. The difficulty with such devices has been largely their delicate fragility and their non-dependability. Aside from this completely automatic sorters for some physical qualities of lumber, such as grade and species, are not presently known. The present tendency has been toward the semiautomatic sorter requiring the judgment of an operator to make a classifatory decision, with the machine thereafter automatically carrying out the sorting operation. The instant sorting device is one of this nature, differing from those presently known in the art as pointed out in the objectives of the invention.

Automatic piling devices, though known in the art, have also not found ready acceptance, apparently again because of their fragile and undependable nature and their size and relatively high cost. Of the piling devices known, most pile from the top of the pile or from one side or end of a board. The instant invention piles from the bottom of a stack to facilitate the piling operation by making it independent of physical dimensions of the board piled and to promote the easier removal of a pile of boards.

With these background factors in mind, the various purposes and objects of the instant invention are these:

A principal object of the instant invention is to provide a combined semiautomatic sorter with a plurality of co-operating pilers adapted to pile sorted lumber from the bottom upward.

A further principal object of my invention is to provide such a device having a discontinuous oscillatory motion in paired opposed rails adapted to move boards through such sorter.

A further principal object of my invention is to provide a device of the nature aforesaid that is adapted to fit into existing sawmill operations and receive lumber from a green or sorting chain without extensive alterations of the existing equipment.

Another principal object of my invention is to provide a lumber piling device adapted to pile lumber from the bottom upward to facilitate moving such piles by machinery operating at or above the bottom level of such pile, and to avoid piling based on planar size of lumber piled.

Another and further object of my invention is to provide a device of the nature aforesaid of relatively small size and rugged dependable operative nature.

Another and further object of my invention is to provide a device of the nature aforesaid that is new and novel in design and principle and that is of substantially more economical manufacture than known devices accomplishing the same ends.

For further comprehension of my invention and of the objects and advantages thereof, reference is now made to the following specification and accompanying drawings and appended claims, wherein the various novel features of the invention are more particularly set forth.

In the accompanying drawings, which form a part of the specification, and in which like numbers of reference refer to similar parts throughout:

FIGURE 1 is an isometric view of my invention from a point rearward, above and to the side of it, showing its general configuration and arrangement of parts.

Referring now to the drawings in greater detail, and particularly that of FIGURE 1, it will be seen that my invention comprises essentially a lower sorting portion 20 immediately below and supporting an upper piling portion 21. In describing the invention it will be convenient to refer to the ends and sides of the device; for this purpose the end receiving lumbers will be referred to as the forward end that carrying the activating parts will be referred to as the rearward portion, the reference also indicating the flow of lumber through the device.

The lower sorting portion 20 is contained by a box-like frame 23 comprising the similar longitudinal sides 24 structurally communicating and positioned by the cross supports 25. The rearward-most portion 26 of the frame 23 is slightly narrower than the forward main body portion 27, to better accommodate the cam rod activators 50, 51. Longitudinal rail decks 28 are carried by the upper surface of the cross supports 25. Since these rail decks 28 support the activating rails 32, and since these activating rails must be spaced preferably 3 to 4 feet apart, the center spacing of the rail decks 28 must be similar. Each of these rail decks 28 is provided with a pair of parallel longitudinally extending rail grooves 29, adapted to receive the mating projections 37 of the activating rail 32 and slideably carry such projections 37 therein. The bottom portion of this rail groove 29 is provided with a plurality of rail supporting rolls 30 supported upon the shafts 31, which in turn are journaled in the opposite sides of the rail groove 29 so as to provide a free longitudinal movement of the activating rails 32 along the rail grooves 29 parallel to each other. The number of rail decks 28 required for a particular size of my invention will obviously vary with the maximum size of lumber to be dealt with; the arrangement with three-rail decks as illustrated is adapted for use with lumber up to about 12 feet in length.

Interposed between the respective rail decks 28 are the stationary support rails 33. These rails 33 extend from the forward cross-support 25 to and beyond the rearward cross-support 25 continuing in a forward direction very nearly as far as the forward-most projection of the activating rails 32. The height of these rails 33 above the frame 23 is rather critical, as hereinafter set forth, and should be such that the upper surface of the support rails 33 is lower than the upper surface of the activating rails 32 but yet high enough to cause the lumber spacing cogs 34, projecting upward from the upper surface of the stationary rails 33 to maintain lumber moved through the device parallel across the rails 33, 32. The longitudinal spacing of the cogs 34 along the upper surface of the stationary rails 33 is also critical; it must be such that a board carried by the activating rails 32 will come to rest against opposed pairs of spacing cogs 34 when the activating rails are at the rearward-most portion of their carriage as hereinafter described.

The paired activating rails 32 are carried in the rail groove 29 of the rail decks 28. A moving rail 35 and a platform rail 36 comprise respectively each pair of activating rails 32. Each has a lower projecting tenon portion 37 adapted to be slidably carried within the rail grooves 29 and upon the supporting rolls 30.

Figure 11:
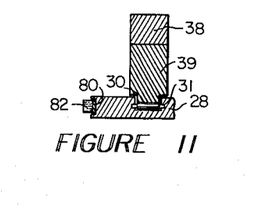
FIGURE 11 is an orthographic cross-sectional view of the moving rail of FIGURE 6 taken on the line 11—11 in the direction indicated by the arrows thereon.

The moving rails 35 comprise an upper part 38, approximately ⅓ of the depth of the rail, hingeably supported and carried by the lower portion 39. The lower portion 39 of the rail 35 is of sufficient length to project somewhat beyond both the forward cross-support 25 and rearward cross-support 25 and the upper portion 38 of the rail is somewhat longer than the lower portion 39 so as to project over and protect the activating mechanism of the device. Each of these rails 35 has a rectangular cross-section similar to that illustrated in FIGURE 11. The overall height of the moving rail 35 is somewhat critical, being constrained to one only very slightly less than the overall height of the platform rail 36 and very slightly greater than the overall height of the stationary rail 33.

The upper portion 38 and lower portion 39 of the moving rail 35 are hingeably supported and connected by the rods 40, each journaled in an appropriate bearing 41 in the respective members. The connecting rods 40 are U shaped members with relatively short legs, having the legs journaled in the bearing 41 with the intermediate body portion projecting outward to connect the upper and lower portions of the rail 35. The respective ends of a particular connecting rod 40 should be so positioned in the upper and lower parts 38, 39 of the moving rail 35 so as to give adequate physical support and also so that the central portion of the U will make an angle of approximately 30° with the deck rail 28, sloping in a rearward direction. I prefer to position connecting rods every 3 feet or so along the moving rail 35, but of necessity there must be 2 such connecting rods in any member no matter what its length.

Figure 5:
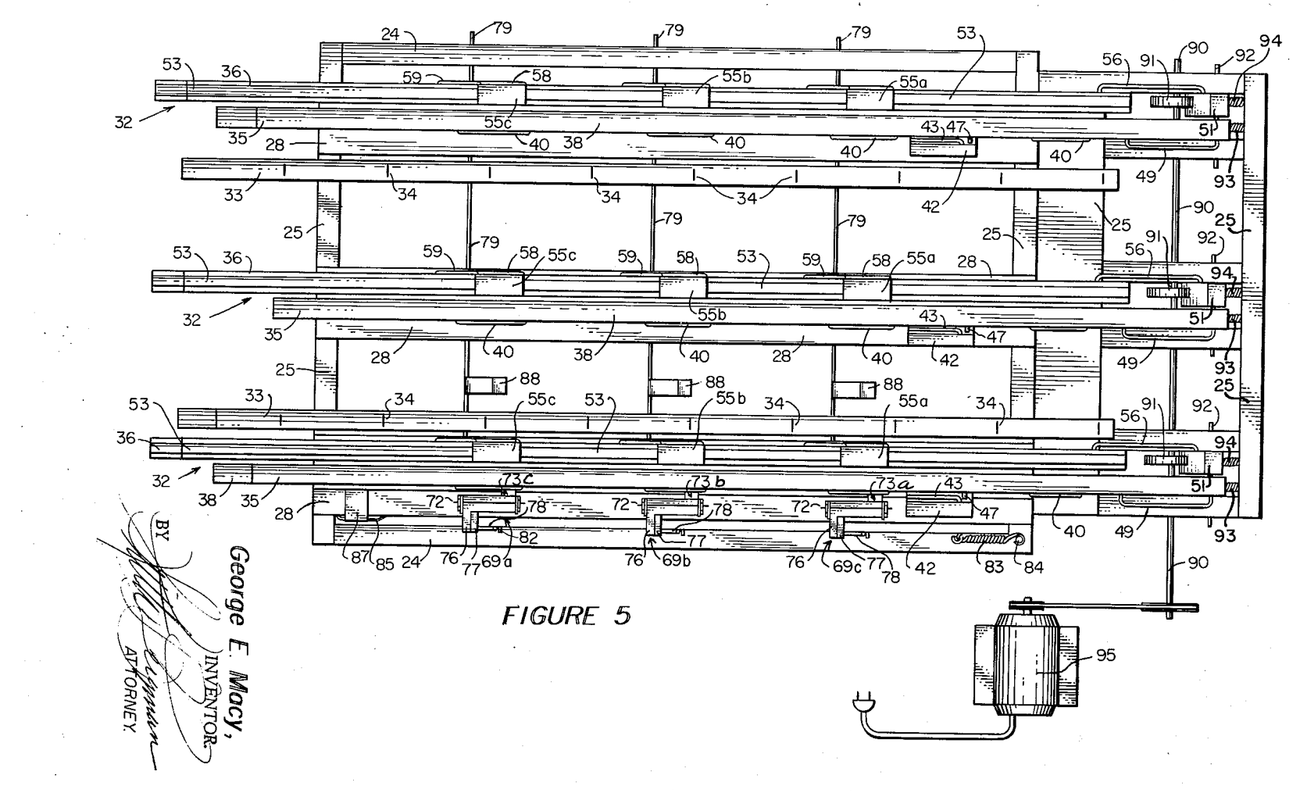
FIGURE 5 is an orthographic projection of the plan of my invention with the piling mechanism removed looking downward upon it, showing the arrangement of parts and their cooperation.
Figure 16:
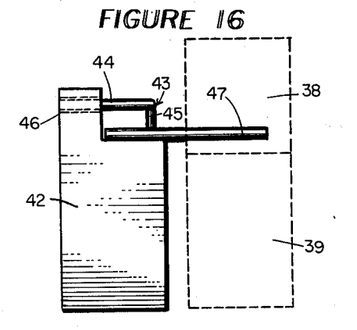
FIGURE 16 is an orthographic end view of the lifting block, showing the channel therein and lifting mechanism associated therewith.
Figure 17:
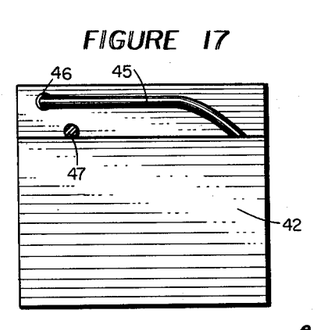
FIGURE 17 is an orthographic view of the block of FIGURE 16, showing the side thereof facing the rails.

From this construction it will be seen that the upper portion 38 of the moving rail 35 may be lifted upwardly and forwardly in relation to the lower portion 39 of said member. This lifting motion is accomplished, in conjunction with a sliding motion of the rail 35, by means of the lifting block 42. This lifting block 42 is substantially of the rectangular shape illustrated in FIGURE 5, FIGURE 16 and FIGURE 17 with a rectangular channel milled in the upper rail facing side. A lifter rod 43 having a pivot portion 44 perpendicular to its main body portion 45 is journaled in the bearing 46 near the upper portion of the lifting block 42 so that the main body 45 of the lifter rod 43 is free to raise in a plane perpendicular to the rail deck 28 and parallel to the rail 35. A lifting pin 47, provided in the upper portion 38 of the moving rail 35, projects outwardly therefrom so that it may come into engagement with the body portion 45 of the lifter rod 43, which is shaped substantially as illustrated in FIGURE 5. The lifting block 42 is rigidly connected to the rail deck 28 so that the moving rail 35, when in motion, will move relative to it. As the sliding rail 35 moves forwardly from its rearwardmost position illustrated in FIGURE 5 and partially cut-away view of FIGURE 6, the lifting pin 47 will move along the lower surface of the channel of the lifting block 42 and will cause the lifter rod 43 to raise slightly to allow the pin 47 to pass under it, but on the next rearward motion gravity will cause the lifter rod 43 to return to its normal position illustrated, and the lifting pin 47 will follow along the upper surface of the body 45 of the lifter rod 43 thus causing the upper portion 38 of the moving rail 35 to be raised away from the lower portion 39 which remains in contact with the supporting rolls 30 in the rail groove 29, again by reason of gravity.

An extension spring 48 communicates between the lower portion 39 of the moving rail 35 and the cross-support 25 to bias the sliding rail 35 to a forward position. The rearward portion of the lower part 39 of the moving rail 35 communicates by the connecting rod 49 with the moving rail activating rod 50, which is journaled in the base member by appropriate bearings.

Figures 6, 7, 8:
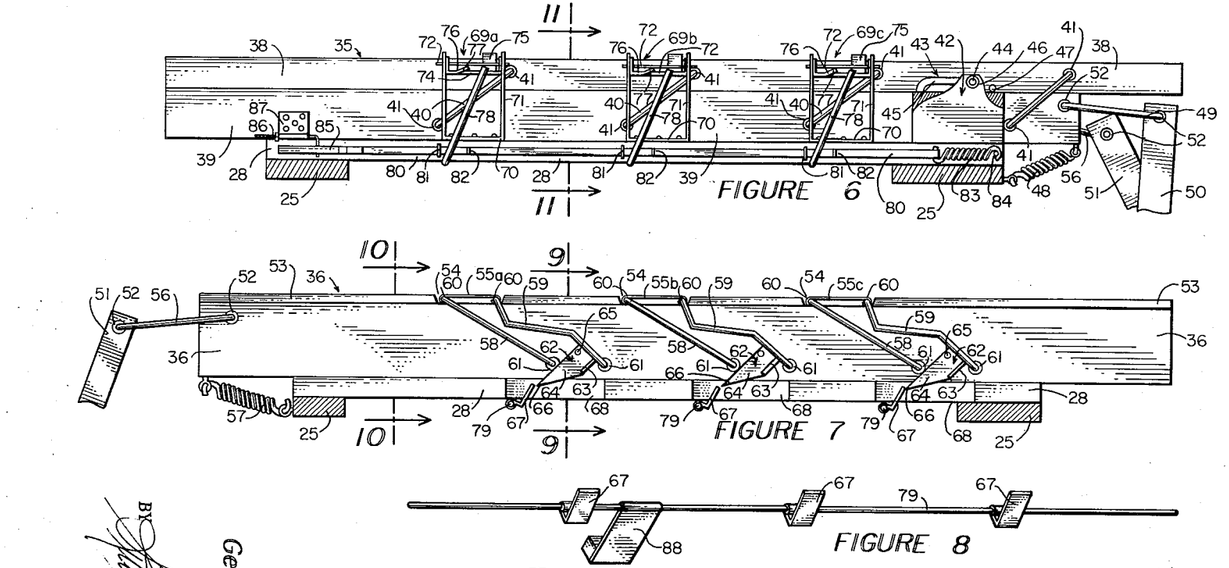
FIGURE 6 is an orthographic projection of the switch side of one of the moving rails of my device, a portion of the lifting block being partially cut away to show its operation.
FIGURE 7 is an orthographic side view of one of the platform rails of my invention showing the platform lifters associated therewith.
FIGURE 8 is an isometric view of the torsion control rod of my invention showing the lifter activators thereon.
Figure 9:
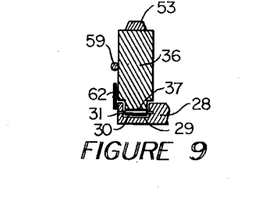
FIGURE 9 is an orthographic cross-sectional view of the platform rail of FIGURE 7, taken on the line 9—9 thereon in the direction indicated by the arrows.
Figure 10:
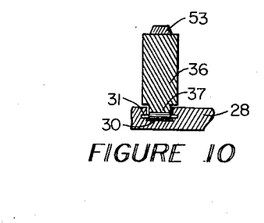
FIGURE 10 is an orthographic cross-sectional view of the platform rail of FIGURE 7 taken on the line 10—10 in the direction indicated by the arrows thereon.

A sideview of the platform rail 36 is shown in FIGURE 7 of the accompanying drawings, but it should be noted that this view is taken from the opposite side of the rail 36 as that of FIGURE 6, and the forward and rearward ends are therefore reversed from those of FIGURE 6. The platform rail 36 proper is an elongate member of rectangular cross-section substantially as illustrated in FIGURES 9 and 10, with a length substantially the same as that of the moving rail 35. A relatively thin crown portion 53 is provided on the uppermost surface of the rail 36 to absorb the primary physical abuse of the rail 36. It can be easily replaced. Sections of this crown 53 are removed to provide notches 54 of such size and shape that the lifter platforms 55 will fit therein, with their upper surface flush with the upper surface of the crown 53. To accomplish this purpose it is most convenient, obviously, if the thickness of the crown portion 53 is substantially the same as that of the lifter platform 55.

A connecting rod 56, journaled in appropriate bearings 52, communicate between the upper rearward portion of the platform rail 36 and the upper portion of the platform rail activating rod 51 to communicate motion therebetween. The connecting rod 56 is shaped substantially as illustrated in FIGURE 7 with ends bent perpendicular to the body to rotatably bear within the bearings 52. An extension spring 57 communicates between the rearward lower portion of the platform rail 36 and the rearward portion of the crosspiece 25 to bias the rail 36 to a normally forwardly extended position.

The lifter platforms 55 are formed from a length of sheet material of a width substantially equal to that of the body of the platform rail 36 in a length sufficient to allow the ends 60 to be bent in a cylinder-like fashion on the under side of the lifter platforms 55, to rotatably receive the projecting ends of the lifter rods 58, 59. The lifter rods 58, 59 are formed from cylindrical rod material to substantially the shape illustrated in FIGURE 7, with pivotable end portions bent perpendicularly to the main body portion to rotatably bear in the end 60 of the lifter platform 55 and within the bearing 61 journaled, as illustrated, in the lower portion of the lifting rail 36. The lifter rod 58 is a straight U shaped member with pivotal end portions bent perpendicular to the body. The lifter rod 59 is bent substantially to the shape illustrated, also with projecting end portions perpendicular to the body to provide pivot points. The shape, length and positioning of the bearings 61 must be such that when the lifter rods 58, 59 pivot in a forward direction the lifter platform 55 will move and continue with its upper surface always parallel to the top surface of the platform rails 36.

The lifter rod dog 62 is shaped from a piece of sheet material substantially as illustrated, with a portion 63 projecting outwardly perpendicular to the main body 64 of the dog. This member 62 is pivotably supported in a position upon the side of the platform rail 36 by the pin 65 communicating therethrough. The downwardly projecting point 66 of the lifter dog 62 must be of sufficient length to engage the member 67 when in its upward extended position. A notch 68 of appropriate size and position must be provided in the deck rails 28 to allow free movement of the lifter rod dog 62 and the member 67 and allow communication therebetween.

The lifting system of my invention is activated by one of the series of switches 69a, 69b, 69c. Each switch 69 comprises the U shaped body member with the base 70 structurally communicating with the rail deck 28a on the right side of my invention. This deck 28a should be slightly wider than the other rail decks 28 to provide room for these switches 69. The legs 71 of the switch body project upward to substantially the same plane as the top of the moving rail 35 and carry in their uppermost portion the axle 72. Rotatably supported upon this axle 72 is the trigger mechanism 73, comprising the U shaped body portion 74, pivotably carried upon the axle 72 and having the trigger 75 projecting toward the moving rail 35 and a control arm 76 projecting in the opposite direction. The rearward extending portion 77 of the control arm 76 should be bent slightly upward as illustrated to allow ready passage of the control arm 78 thereunder in a forward direction but prevent its passage in a rearward direction unless and until the trigger 75 be tripped by a board. The upper surface of the trigger 75 should be on a horizontal plane slightly above that of the upper surface of the moving rail 35, so that when a board carried upon the sliding rail be deposited downwardly upon the trigger 75, the trigger 75 will be forced downwardly, the control arm 76 of necessity upwardly, and the arm 78 of the cross rod 79 thus released to its biased rearward position, thus rotating the cross rod 79 partially. The control arm 76 should be weighted sufficiently so that the center of gravity of the trigger 73 about the axle 72 is on the control arm side and the trigger mechanism 73 will thus be reset automatically by action of gravity.

A band-like reset member 80 is slideably connected to the switch side of the rail deck 28a by the supports 81. This member has the laterally extending cogs 82 adapted to come against the control arms 78 of the cross rods 79 to reset such rods, upon their release, in response to appropriate sliding motion of the member 80. The slide member 80 is biased to a rearward position by means of the extension spring 83 communicating between the rearward end of the member 80 and the spring pin 84 contained in the rearward portion of the side of the deck rail 28a. The forward portion of the slide reset member 80 is formed into a narrow loop 85, through which the member 86 communicates forward motion of the moving rail 35 to the member 80 by means of the rod 86 being adjustably supported by the plate 87 upon the lower portion 39 of the rail 35.

Figures 18, 19:
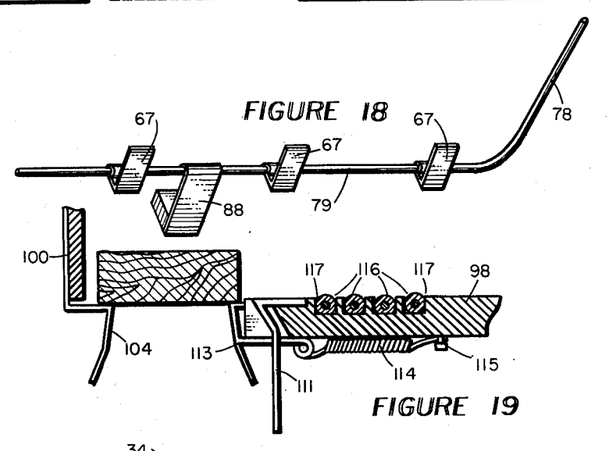
FIGURE 18 is an isometric view of a cross rod and attached arm from my invention.
FIGURE 19 is a cross-sectional view of FIGURE 2, taken on the line 19—19 thereon in the direction indicated by the arrows, showing in detail how a board is supported by the piling catches.
Figure 20:
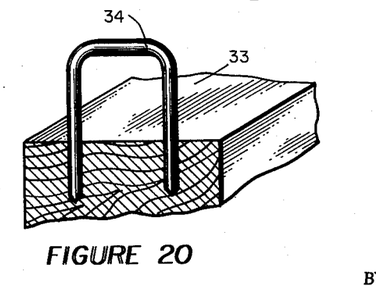
FIGURE 20 is a detailed isometric view of a spacing cog of my invention, in place upon a stationary rail.

Each of the cross rods 79 are substantially of the shape illustrated in FIGURE 8 and FIGURE 18, and each non-rotatably carries a plurality of spaced cross-arm triggers 67, adapted to communicate with the lifter rod dogs 62 of the platform rails 36. A torsion arm 88 is provided to bias these rods 79 to a clockwise rotation and thus maintain the arm 78 in a biased rearward position. The cross rods 79 are pivotably supported in the position indicated by bearings carried on the under portion of the rail decks 28.

Figure 12:
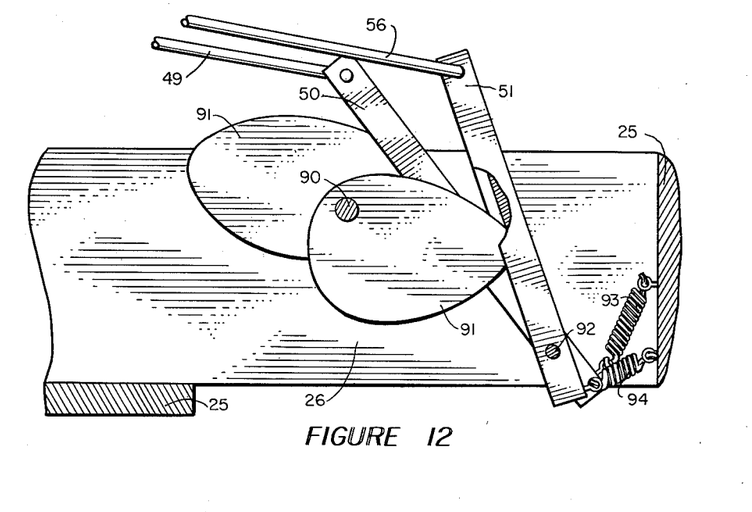
FIGURE 12 is a partially cut-away orthographic view of the cam portion of one set of activating rods of my invention showing the general configuration of the cams and their operation.

The activating mechanism of the slide rails 32 is best illustrated in the drawing of FIGURE 12. The drive shaft 90 is journaled in appropriate bearings 89 in the frame 23 and carries a pair of similar cams 91 for each pair of activating rails 32 used in my machine. These paired cams 91 are identical with each other in size and shape but are non-rotatably positioned 180° apart upon the main drive shaft 90. The cams 91 are shaped substantially as illustrated to provide a return cycle approximately twice as fast as a moving cycle for each of the activating rails 32. The activating rods 50, 51 are pivotably supported upon an axle 92 journaled in the frame 23 at a point below that of the main drive shaft 90. Each of the activating rods 50, 51 has a central milled cam groove in its forward surface adapted to receive and contain the periphery of one of the cams 91, and each is biased, so as to have its upper portion normally projecting rearwardly, by means of the extension springs 93, 94 extending respectively from the activating rods 50, 51 to the frame cross support 25. Each of the activating rods 50, 51 are respectively connected by the connecting rods 49, 56 to the moving rail 35 and platform rail 36. By means of this arrangement of parts it is to be seen that a rotary motion created in the main drive shaft 90 by some prime mover 95 will be communicated to the cams 91 which will change this motion to a reciprocating one by action of the cams 91 upon the activating rods 50, 51 and this will in turn be transmitted to the rails 35, 36.

The distance of lateral projection of the triggers 75 toward the moving rail 35 is most critical. The distance between the trigger mechanism 75 and the moving rail 35 closest to the trigger should become decreasingly less from the switch 69a to 69b and again decreasingly less from 69b to 69c. This is necessary for the semiautomatic operation of my device as hereinafter described.

The piling mechanism 21 of my device is best illustrated in FIGURES 1 to 4 respectively. The piling mechanism is carried by a frame 96 comprising the side members 97 and cross members 98 shaped and sized to fit over the sorting mechanism 20 immediately hereinbefore described. The piling slots 99 are positioned so as to be immediately vertically above the lifter platforms 55 when they are at their highest lift position. A board carried thereby will thusly be positioned and presented to the respective piling slots 99a, 99b and 99c.

A pile back support 100 is provided on the forward edge of each of the piling slots 99. This back support 100 comprises the planar support member 101 pivotably communicating with the arms 102 which in turn pivotably communicate with the upright support 103 structurally carried by the portion of the cross member 98 immediately forward of the piling slots 99. From this construction it is seen that the support member 101 may be moved in a forward or backward direction, as desired, to regulate the effective size of the piling slot openings 99. This member could be mechanically activated and moved, quite obviously, by mechanical means well known in the arts.

Figure 2:
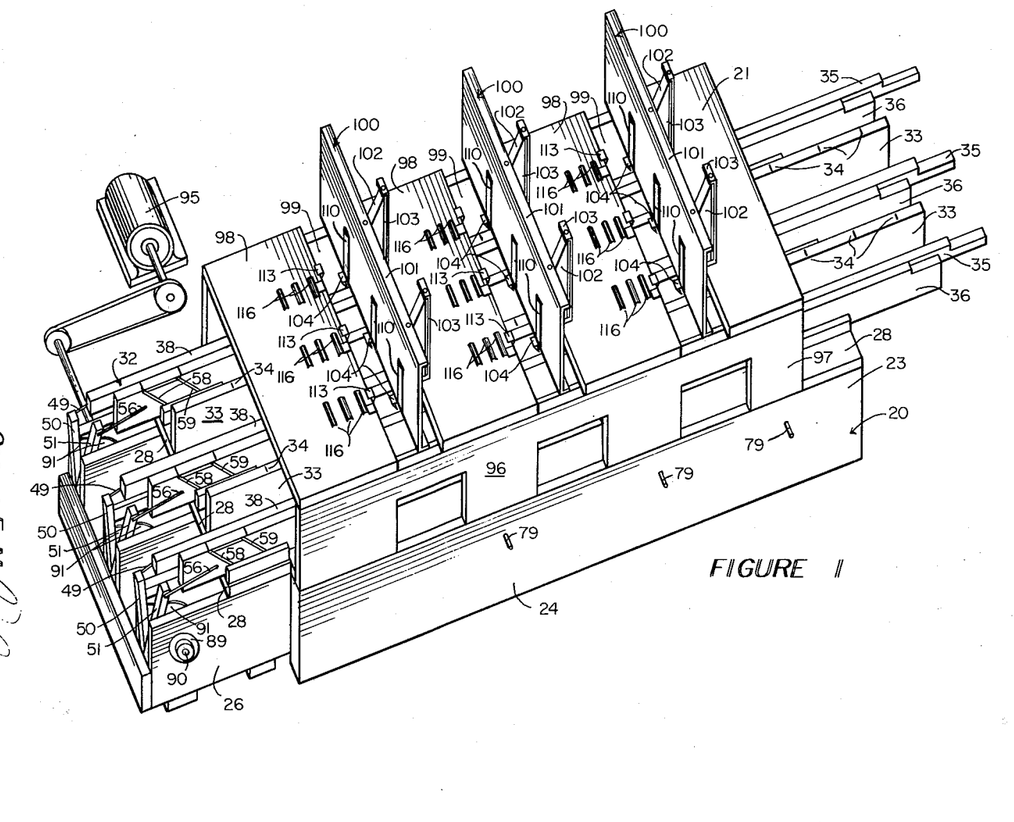
FIGURE 2 is an isometric view of the pile-moving portion of my invention, again looking downward from a point to the side and to the front, showing the detailed structure and operation of this member.
Figure 2:
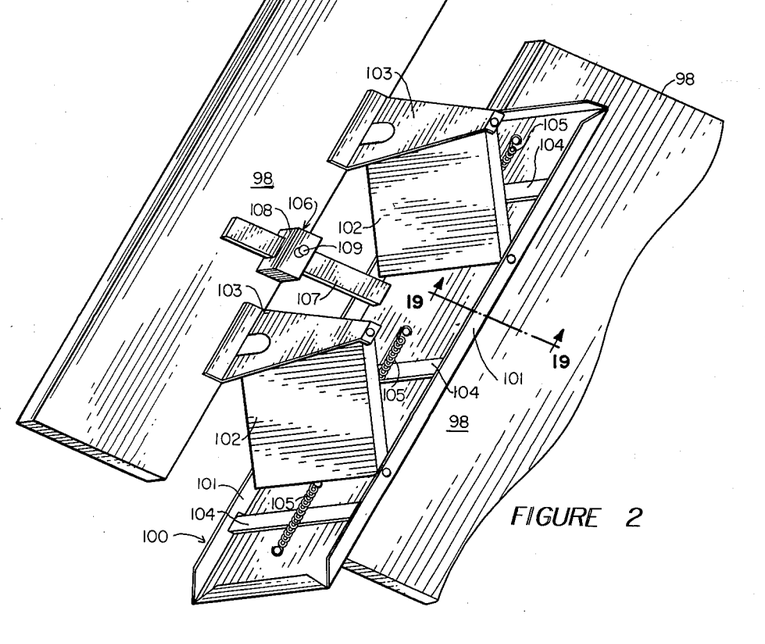

From the rearward view of this pile back support 100 shown in FIGURE 2, further structural detail will be seen. The piling catch 104 moveably carried by the support member 101 is shaped substantially as illustrated and is biased to a normally rearward position by means of the extension spring 105 connected to the back of the member 101 as illustrated. The position of the support member 101 is maintained constant by means of the adjustable support 106 having the extendable support arm 107 adjustably maintained in the support block 108 by means of the set screw 109, the block 108 structurally communicating with the cross piece 98. The support member 101 is provided with rolls 110 to assist in the easy removal of a stack of piled lumber from over the piling slots 99 to the stacking portion of the cross member 98.

Figure 3:
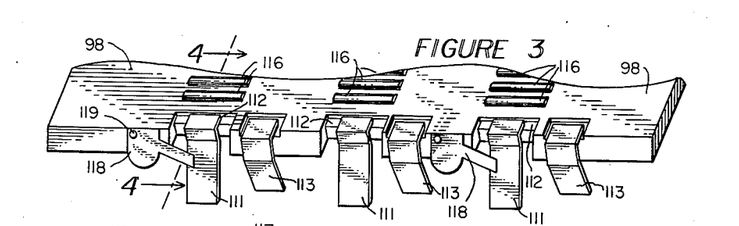
FIGURE 3 is an isometric view looking downward at the rearward leading edge of the piling orifice of my invention.
Figure 4:
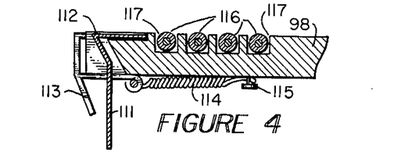
FIGURE 4 is a partial cross-sectional view of the rearward edge of the piling orifice of my invention shown in FIGURE 3, taken on the line 4—4 of FIGURE 3 in the direction indicated by the arrows thereon.

The part of the cross member 98 forming the rearward edge of the piling slot 99 is illustrated in FIGURE 3. The stop member 111 projects downwardly from the rearward edge of the cross piece 98 to stop the forward motion of a board to be piled by stopping the platforms 55; it is fastened within an appropriate recess 112 so that it will not project upwardly further than the upper surface of the cross piece 98. The member 111 is shaped substantially as illustrated in FIGURE 3 and the cross sectional view of FIGURE 4. Three such members are preferably provided in the cross piece 98 to assure straight piling. The rearward piling catch 113, shaped substantially as illustrated, is biased to an outwardly extending position by the extension spring 114 fastened to the underside of the cross member 98 by the pin 115.

The upper surface of the cross members 98 are provided with a series of rolls 116 journaled in appropriate recesses 117 so that only a small portion of their upper part projects beyond the surface of the member 98 to aid in moving stacks of lumber thereover.

The pile straightener 118 is shaped substantially as illustrated and fastened to the rearward edge of the piling slot 99 by the pivot pin 119. This member 118 raises as a board is piled, to properly align the rear edge of boards in the pile and returns to its normal position by means of gravity thereafter.

Figure 14:
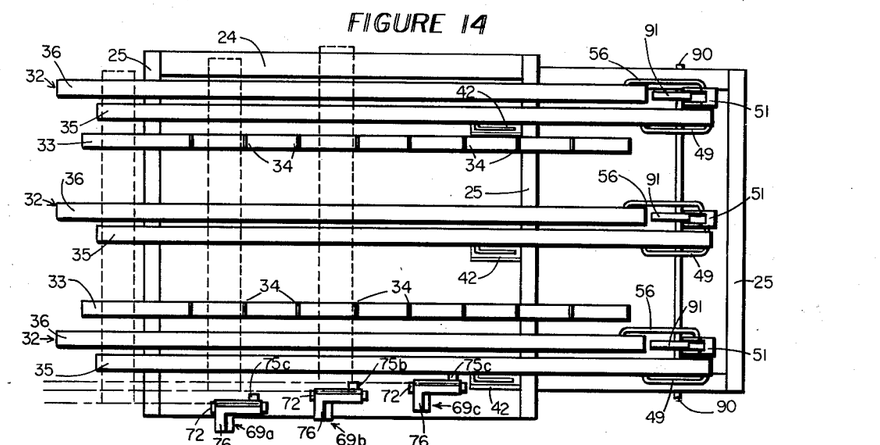
FIGURE 14 is a semi-diagrammatic drawing showing the relative positioning of three boards adapted to trip, respectively, each of three triggers.

In operation, sawed boards are presented to the forward portion of the activating rails 32 in an edge to edge fashion. The prime mover 95 is activated, to drive the main shaft 90, and the machine is set in operation. An operator positioned to the forward of the piling frame 96 positions each board longitudinally on the rail appropriately to trip one of the trigger mechanisms 73 by reason of the lateral positioning of the board. This sorting may be based upon size, specie, grade or any other characteristic desired. To accomplish this end the inward projection of each of the several triggers 75 toward the rail 35 must be different, trigger 75a having the least inward projection, 75b somewhat more inward projection and 75c more still all as diagrammatically illustrated in FIGURE 14.

Figure 15:
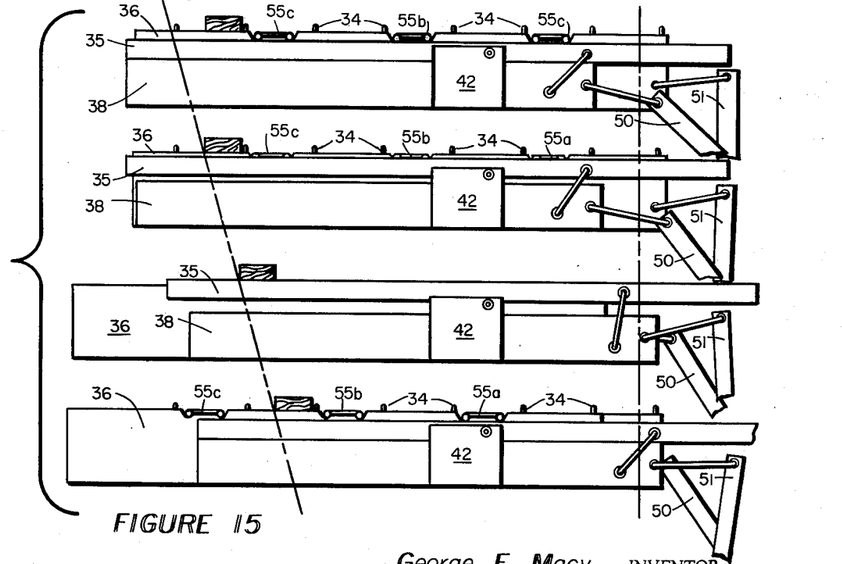
FIGURE 15 is a composite semi-diagrammatic drawing, comprising four diagrams, illustrating the relationship between the moving rail and platform rail at different phases of operation.

By reason of the aforesaid structure, a particular board will be moved rearward upon the forward motion of the moving rail 35 in a discrete step and will be rested upon the platform rail 36 when the moving rail 35 has gone rearward to its furthermost point, since the upper portion 38 thereof thence lowers itself to a plane lower than that of the platform rails 36 as diagrammatically illustrated in FIGURE 15.

Boards in the machine will thusly be moved in discrete steps rearward along the rails and will be maintained straight by the cogs 34 of the rails 33 positioned at the end of each board step. This cog 34 positioning must also be appropriate, relative to rails 35 and 36, to cause the discrete steps to bring a carried board to rest over the switches 72 or raising platforms 55 as occasion requires.

The lifting switches 69a, 69b, 69c are positioned, each, respectively, one discrete board stop foreward of the lifting platforms 55a, 55b, 55c, so that on the next step immediately after passage of a board over a lifting switch 69, it will be positioned over the corresponding lifting platform 55. If in the passage of the board passed one of the lifting switches 69a, 69b, 69c, it be set upon the the trigger 75a, 75b, 75c, the switch will operate to release the control arm 78 of the cross rod 79 which in turn will position the cross arm dog 67 so that the lifter dog will engage it on the next rearward motion, thus lifiting the appropriate lifter platforms 55 upon which the particular board rests.

The board will then be raised by the lifting platforms 55, through the appropriate piling slot 99, and retained therein by reason of the piling catches 104, 113 engaging the bottom of the board. The machine will thusly continue to operate, positioning any number of boards desired and piling them in the appropriate pile.

If it should be desired to align several stacks of boards for bundling or easy removal of the group, a single stack may be moved from the piling slot 99 by activating the appropriate pile back support 100 by pushing this member rearward. The pile over this piling slot 99 will then be moved rearward onto the appropriate cross member 98 and the pile back support 100 can then be returned to its previous position for the stacking of another pile.

It is to be noted from the structure recited that the pile back supports 100 may be adjusted to accommodate varying widths of lumber. It is further to be noted that the piling slots 99, associated piling triggers 73 and various other parts may be multiplied in number and enlarged to give greater sorting classifications without change in scope or spirit of the invention. Mechanical means of moving the pile back support 100 and automatic pushbutton controls for activating the sorting switches 69 could also be added without changing the scope of the invention.

Figure 13:
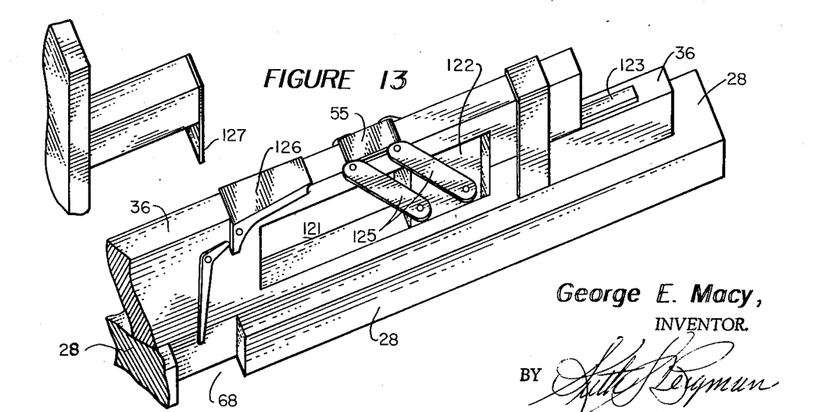
FIGURE 13 is an isometric view of an alternative improved form of lifter that is readily adaptable for use in my invention, showing its parts, configuration and operation.

A secondary lifting system, which could replace that theretofore described in my invention, is illustrated in FIGURE 13. An appropriate notch 121 would have to be provided in the lower part of the platform rail 36 to allow for passage of the lower lifting block 122. In this version of lifter, the rail 36 would remain stationary and the lifting block 122 would be provided with the motion given the rail 36 in the specie of my invention hereinbefore set forth by means of the band 123 mechanically activated by the activating rod 51. The lower lifting block 122 is pivotably connected to the upper block 55 by the straps 125. With this version of lifter, if a lifting trigger 73 be tripped the lifting catch 126 would be raised slightly so as to engage the forward edge of the upper lifting block 124. Upon the further forward motion of the lower lifting block 122, the upper block 55 will be raised as illustrated. A downwardly projecting reset finger 127 engages the lifting catch 126 at the end of its lift, causing it to fall backward and reset by operation of gravity for the next cycle. If the lifting catch 126 is not activated to raise slightly, the upper lifting block 124 will pass over it without raising the board carried thereby.

Although the foregoing description is necessarily of a detailed specific character, in order that a specific embodiment of my invention may be set forth, it is to be understood that this specific terminology and structure are not intended to be restrictive or confining and that various rearrangement of parts and modification of detail be resorted to without departing from the essence, scope, or spirit of the invention herein set forth.

Having thusly described my invention, what I desire to protect by Letters Patent and what I claim is:

1. In a lumber moving and sorting device of the nature aforesaid, the combination of: an elongate frame having cross pieces supporting a plurality of longitudinal rail decks adapted to receive and slideably support in a parallel fashion paired activating rails; a plurality of paired activating rails carried by said rail decks comprising in each pair a two piece moving rail having an upper portion pivotably communicating with the lower portion and adapted to raise upon rearward motion above the upper surface of a moving rail, and a platform rail having an upper surface slightly higher than that of said moving rails; a plurality of paired cams each associated with activating rods pivotably communicating with said paired activating rails, each of said pairs of cams being diametrically out of phase with its mate and of a configuration to cause a reciprocating motion in said rails with each directly out of phase with its mate and having a forward motion approximately twice as fast as its rearward motion, said platform associated cam being adapted to move said platform rail rearwardly, upon the lowered forward cycle of the moving rail, to carry boards thereon rearwardly and elevate boards positioned upon spaced pivotable platforms associated with said platform rails upon predetermined cycles; lifting blocks associated with each moving rail to cause the upper portion thereof to raise on rearward motion with its upper surface above that of said platform rails to cause boards carried thereupon to move rearward thereover; and a prime mover communicating with said cams adapted to activate said cams as aforesaid.

2. In a semi-automatic lumber moving machine of the nature aforesaid, in combination: an elongate frame with cross pieces supporting a plurality of longitudinal rail decks having paired parallel longitudinal grooves therein adapted to receive mating projections of paired activating rails and slideably support said rails; a plurality of paired activating rails, spring biased to a normally forward position, carried by said rail decks, each pair comprising moving rail having an upper portion pivotably communicating with a lower portion, said upper portion adapted to raise upon rearward motion, and a platform rail carrying a plurality of spaced lifting platforms, recessed in the upper part thereof so as to form a flush upper surface, said surface being slightly higher than that of said moving rail with its upper part in lower position; lifting blocks associated with each moving rail to cause the upper portion thereof to raise on rearward motion of said rail to a level above the upper surface of said platform rails; elongate stationary rails interposed between said pairs of activating rails having upward projecting spacing cogs to space and align boards carried thereacross; a plurality of paired cams, each associated with activating rods pivotably communicating with said paired activating rails, each of said pairs of cams being diametrically out of phase with its paired mate and of a configuration to cause a reciprocating motion in said paired activating rails with each of a pair of rails diametrically out of phase with its mate and with a forward motion approximately twice as fast as the rearward motion, adapted to move boards carried across said rails in discrete steps longitudinally therealong; a plurality of activating switches, each associated with a co-operating group of lifting platforms, to cause the members of the group to raise on the cycle immediately after the cycle of a predetermined signal to raise boards carried thereby to aid in their removal and on the cycle thereafter return to a normally null position; and a prime mover adapted to furnish power to said cams to provide such function.

References Cited by the Examiner
UNITED STATES PATENTS

| 1,343,373 | 6/20 | Pedersen | 198—219 |
| 1,775,121 | 9/30 | Einfeldt | 198—219 |
| 2,792,950 | 5/57 | Fenton et al. | 214—6 |
| 3,092,266 | 6/63 | De Koning | 213—6 |

GERALD M. FORLENZA, *Primary Examiner.*

MORRIS TEMIN, HUGO O. SCHULZ, *Examiners.*